Figures 1, 2:
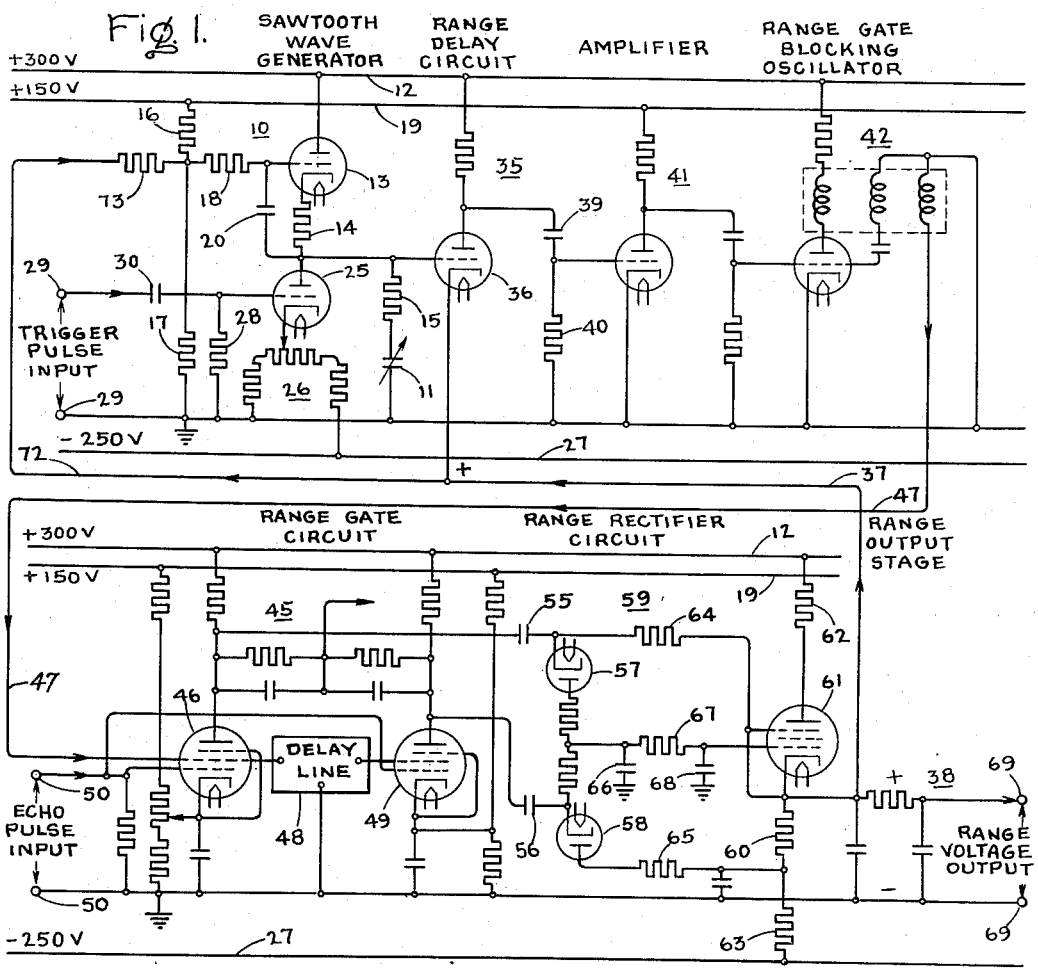

Dec. 13, 1955

H. F. MAYER 2,727,209

PRECISION TIME INTERVAL MEASURING SYSTEM

Filed Nov. 19, 1949

Inventor:
Harry F. Mayer,
by Merton D. Morse
His Attorney.

United States Patent Office 2,727,209
Patented Dec. 13, 1955

2,727,209

PRECISION TIME INTERVAL MEASURING SYSTEM

Harry F. Mayer, Baldwinsville, N. Y., assignor to General Electric Company, a corporation of New York Application November 19, 1949, Serial No. 128,431

4 Claims. (Cl. 324—68)

My invention relates to an electrical system for measuring the time interval between two events with extreme precision. Such a system has particular utility, for example, in a pulse radar ranging system of the type in which extremely short pulses of high frequency energy are periodically radiated toward a remote object, the range of the object being determined by measuring the very short time intervals required for the pulses to travel to the remote object and to be returned as radar echo pulses.

Since the velocity of radio waves is accurately known, the range to the remote object is, therefore, a linear function of the time between transmission and receipt of corresponding pulses.

In a time interval measuring system of this type, it is often desired to express the time interval as a unidirectional potential. In a radar tracking system, this potential may then be supplied to electronic directors or computers which are adapted to receive the target range information in terms of such potential.

In one prior art type of time interval measuring system, the duration of the interval is determined by measuring the voltage rise upon a capacitor during the interval, the capacitor being arranged to be charged as linearly as possible from a high voltage source through a high impedance. The capacitor is normally maintained discharged to a predetermined low level, and is arranged to commence charging at the beginning of the time interval to be measured. Means are then provided for accurately measuring the rise in voltage on the capacitor at the termination of the interval. The capacitor is then discharged back to the original level to reset it for the next interval to be measured. Thus, this type of circuit is essentially similar to that which has also been used for linear sawtooth wave generators, with the addition of means for accurately measuring the height of the sawtooth at a predetermined time point.

It is, of course, a familiar fundamental fact that a capacitor has an exponential charging characteristic. The voltage rise can only be made to approximate a linear function with respect to time by charging the capacitor through an impedance which approximates a constant current source as closely as possible. The curvature in the charging characteristic cannot be completely eliminated. In the past, efforts to improve the precision of time interval measurements in systems of this type have been largely directed to improving the linearity of the capacitor charging characteristic. However, I have found that it is possible to obtain much greater precision by compensating for the effect of the curvature, rather than by attempting to eliminate it. Specifically, in accordance with my invention, I provide means for feeding back a control voltage, proportional to the rise of voltage on the timing capacitor at the end of the measured interval, which is utilized to vary the capacitor charging characteristic so as to compensate for the effect of nonlinearity therein.

It is, accordingly, a general object of my invention to provide an improved electrical system for measuring time intervals with greater precision than heretofore possible.

More specifically, it is an object of my invention to provide an improved electronic system for expressing very short time intervals, such as those commonly involved in pulse radar ranging systems, in terms of a unidirectional potential which varies linearly with time.

It is a still more specific object of my invention to provide an improved range voltage generating system for a precision radar range tracking system of the pulse-echo type.

For additional objects and advantages, and for a better understanding of the invention, attention is now directed to the following description and accompanying drawings. The features of the invention believed to be novel are particularly pointed out in the appended claims.

In the drawings, Fig. 1 is a circuit diagram of the timing circuits of a precision pulse-radar range-tracking system embodying my invention; and Fig. 2 is a graph containing illustrative curves which will be referred to in connection with the description of operation of the system of Fig. 1.

The basic timing circuit in the system of Fig. 1 is the sawtooth wave generator 10. This circuit comprises a timing capacitor 11 which has one plate connected to ground. It is arranged to be charged by a connection from the other plate to the positive side of a source of unidirectional operating potential, which is not shown, but conventionally represented by +300-volt bus 12. The charging circuit for the capacitor 11 also serially includes a triode 13, a cathode resistor 14 and a resistor 15. A positive bias potential is impressed on the control grid of triode 13 from a bleeder resistance network 16, 17, through a series resistor 18. Bleeder network 16, 17 is energized from a lower-voltage operating source, represented conventionally by the +150-volt bus 19. The control grid of triode 13 is also maintained at substantially the same alternating potential as the lower end of cathode resistor 14, throughout the operating sawtooth voltage cycle, through a connection including a large coupling capacitor 20.

The timing capacitor 11 and resistor 15 are normally shunted by a relatively low impedance circuit including a trigger tube, also represented as a triode 25. The cathode of triode 25 is connected to ground through a portion of a bias potentiometer 26 having its right-hand end connected to a suitable source of negative bias potential, represented conventionally by the —250-volt bus 27. The control grid of triode 25 is connected to ground through a grid resistor 28. A positive grid bias potential is, therefore, normally impressed upon the control grid of triode 25, rendering it normally conducting.

The timing cycle is initiated by the application of a negative trigger pulse upon input terminals 29, this pulse being impressed upon the control grid of triode 25 through coupling capacitor 30. This pulse must have sufficient amplitude to overcome the positive bias on triode 25 and to render it abruptly non-conductive, and it must also have sufficient duration to maintain triode 25 cut off for a time interval corresponding to the maximum range of the radar system. The leading edge of each negative pulse must also be accurately synchronized with the transmission of each high-frequency pulse from the radar transmitter towards the remote object whose range is to be measured.

The construction and operation of the sawtooth wave generator 10, as thus far described, is more particularly set forth and claimed in a copending application, Serial No. 747,824, filed May 13, 1947, by Robert L. Sink, entitled "Sweep Wave Generating Circuits" and assigned to the same assignee as the present invention. Briefly, as soon as the triode 25 is cut off, the current which was previously flowing through the charging tube 13 and triode 25 now begins to flow into capacitor 11. As is fully explained in the aforesaid Sink application, the circuit connections of the triode 13 are such that it very closely approximates a constant current source, causing the capacitor voltage to rise almost linearly from its initial level when triode 25 is cut off.

As the voltage across capacitor 11 rises, the voltage across triode 13 falls, tending to cause the anode current through it to decrease. However, the decrease in voltage across resistor 14 is transmitted directly to the control grid through the large coupling capacitor 20, counteracting the anode current change to a large degree. However, the current obviously cannot be perfectly constant if resistor 14 is finite, since there must be some reduction in anode current in order for a change in grid-to-cathode voltage to occur.

The series resistance 15 is a very low resistance whose purpose is to overcome the curvature which must exist at the beginning of the sawtooth wave because of the finite time required to reduce the current through the triode 25 to zero. If this current were instantaneously interrupted, an equal current would immediately commence to flow through resistor 15 and capacitor 11, and the voltage at the anode of triode 25 would instantly rise to a value equal to the product of the current and the resistance of resistor 15. The voltage would then rise nearly linearly from this point. When the value of resistor 15 is properly chosen, this tendency to "jump up" will approximately counteract the slow rate of rise of voltage across capacitor 11 caused by the rapid, but not instantaneous, increase in current through resistor 15, resulting in a sawtooth wave of voltage at the anode of triode 25 which is more nearly linear during the first few microseconds than if resistor 15 is omitted.

The rising positive potential from sawtooth wave generator 10 is impressed upon a range delay circuit 35 including a triode amplifier 36. Amplifier 36 is normally maintained non-conductive by means of a positive potential applied to its cathode, through a conductor 37, from a range voltage output network 38, shortly to be described in greater detail. The amplifier 36, which is preferably of the sharp cut-off type, is thus rendered conductive at a predetermined instant of time when the capacitor voltage overcomes the negative grid bias. This instant is controlled by the range tracking circuit now to be described so as to occur exactly at the instant of receipt of an echo from the target whose range is to be measured.

When the amplifier 36 draws anode current, the resultant anode pulse is differentiated by means of capacitance-resistance network 39, 40. The sharp pulse corresponding to its leading edge is inverted and further amplified in an amplifier stage 41 and utilized to trigger a conventional blocking oscillator 42. The oscillator 42 is thus accurately triggered, at the instant the voltage on capacitor 11 rises to a predetermined level, to form a pulse of accurate length for use in a range gate circuit 45.

The range gate circuit 45 is of a type familiar to those skilled in the art. It comprises a first coincidence tube 46 having the blocking oscillator gate pulse impressed on its screen grid through conductor 47. The same pulse is also supplied through a delay line 48 to the screen grid of the second coincidence tube 49.

As will readily be understood by those skilled in the art, the gate pulse width and pulse delay are adjusted so that the coincidence tubes 46 and 49 are rendered conductive in succession for two equal, consecutive gate intervals. These two short time intervals are commonly known as the early gate and the late gate, respectively.

An amplified echo pulse from the radar receiver, corresponding to the echo from the remote object whose range is to be measured, is also impressed simultaneously upon the control grids of the gate tubes 46 and 49 from a pair of input terminals 50. As is well known to the art, the output from each of the coincidence tubes 46 and 49 is zero except when a gate pulse is impressed on its screen grid. If the incoming echo pulse is equally divided between the two gates, then the outputs of the two tubes will be equal. Otherwise, their outputs will be unbalanced, depending upon whether more or less of the echo pulse appears within each gate interval.

The gated pulse signals appearing at the anodes of the coincidence tubes 46 and 49 are supplied through coupling capacitors 55 and 56 to diode detectors 57 and 58, respectively. These diodes comprise elements of a range rectifier circuit 59 whose function is to provide an output range voltage proportional to the average range to the target. Both diodes 57 and 58 are normally biased to non-conductive condition by the voltage drop across a resistor 60 in the common cathode circuit of an output cathode follower stage 61. It will be observed that the anode of stage 61 is connected to the +300-volt bus 12 through a resistor 62, and its cathode is connected to the −250-volt bus 27 through cathode resistors 60 and 63 in series. The cathode of diode 57 is connected to the upper end of resistor 60 through a resistor 64, while the anode of diode 58 is connected to the lower end of resistor 60 through a resistor 65. The values of resistors 60 and 63 are so chosen that in operation about 10 volts drop occurs across resistor 60, thereby providing the desired diode bias voltages, while the drop across resistor 63 is approximately 300 volts.

The diodes 57 and 58 are each arranged to draw current, when conductive, through a common load capacitor 66. It will be observed that they tend to charge and discharge this capacitor in opposite directions. Therefore, if the train of echo signals in the early and late gates are of equal magnitudes, the net charge on capacitor 66 will not change. However, if a greater portion of each echo signal appears in the early gate, the capacitor will tend to be discharged to a lower level. A greater proportion of each echo signal in the late gate, on the other hand, tends to charge capacitor 66 to a higher level.

The resultant average charge on capacitor 66, resulting from the train of consecutive echo pulses, is filtered by the resistance-capacitance network 67, 68 and impressed upon the control grid of the cathode follower output stage 61. Therefore, a corresponding unidirectional potential appears across the cathode resistors 60 and 63, and across the filter network 38 connected to range voltage output terminals 69. As previously mentioned, this is the positive potential which is supplied through conductor 37 to control the potential level at which the range delay tube 36 begins to conduct. Those skilled in the art will thus recognize that the elements just described comprise an automatic range tracking circuit in which the output range voltage automatically adjusts itself for equilibrium such that the instant of time at which triode 36 becomes conducting coincides precisely with the time of occurrence of the selected echo pulse.

If the charging characteristic of the saw-tooth wave generator 10 were precisely linear, the filtered output range voltage at terminals 69 would be exactly proportional to the average time interval between each transmitted pulse and its corresponding echo pulse, and, therefore, exactly proportional to the range to the selected target. However, this can never be precisely true since, as previously explained, the charging characteristic of capacitor 11 must exhibit a slight exponential curvature. This condition is illustrated graphically, in an exaggerated manner, in the curves of Fig. 2, in which range voltage output is plotted against true target range. If the relationship were exactly linear, as desired, the voltage characteristic would be a straight line 70. However, in the system as thus far described, the actual range voltage tends to fall below the true value, as represented by curve 71 (the curvature of which is considerably exaggerated over that met in actual practice, for clarity of illustration). It will be seen that there is a continually increasing range voltage error with range. Thus, at the maximum range $R_{max}$ of the radar system, the measured range voltage will be $E_1$, whereas it should be $E_2$ for perfect linearity.

In accordance with my invention, this error is largely compensated by automatically varying the rate of charge of the timing capacitor 11 as a function of the average range voltage. This is accomplished, as shown in Fig. 1, by applying the range voltage through conductor 72 and isolating resistors 73 and 18 to the control grid of the charging triode 13. Since the polarity of the range voltage is positive with respect to ground, the tube 13 is caused to conduct more heavily at greater target ranges, increasing the rate of charging the capacitor 11. The ideal result is illustrated graphically in Fig. 2 by the curve 74. It will be observed that this curve still contains the objectionable curvature, but its slope has been increased so that it intersects the desired characteristic 70 at the point 75 corresponding to true range. In practice, this condition cannot be completely realized, since the curvature to be compensated is an exponential function, whereas the correction is a parabolic function. However, it can be very closely approached. For example, operating tests were made on a particular radar range tracking circuit which had an error of 6–7 yards in range, at a maximum range of 3,000 yards, when not provided with the feedback connection of my invention. With compensation, this error was found by actual measurement to have been reduced to less than one yard in range—an improvement in the order of magnitude of ten times.

While a specific embodiment of my invention has been shown and described, it will, of course, be understood that various modifications may be made without departing from the invention. It will also be appreciated that the broad principles of my invention may be applied to other forms of precise time interval measuring circuits, other than the specific radar range tracking system illustrated. The appended claims are, therefore, intended to cover any such modifications and applications within the true spirit and scope of the invention.

What I claim as new and desire to secure by Letters Patent of the United States is:

1. A precision time interval measuring system comprising a timing capacitor, means for charging said capacitor including a source of unidirectional voltage and a grid-controlled electron discharge device connected in series with said capacitor, means for normally maintaining said capacitor discharged to a predetermined voltage level, means for disabling said discharging means at the beginning of and throughout said time intreval, whereby the voltage across said capacitor rises during said interval, means responsive to the change in voltage across said capacitor for developing a unidirectional potential proportional thereto, and means for impressing said potential on the grid of said device in a sense to increase the charging current through said capacitor.

2. A precision time interval measuring system comprising a sawtooth wave generating circuit including a timing capacitor and a grid-controlled charging tube and a unidirectional voltage source connected in series, a discharge circuit comprising a normally-conductive trigger tube connected in circuit across said capacitor, means for abruptly cutting off said trigger tube at the beginning of the time interval and maintaining it cut off at least throughout said interval, whereby said capacitor charges from said source during said interval, means responsive to the change in voltage across said capacitor at the end of said time interval for developing a positive unidirectional potential proportional thereto, and means for impressing said positive potential on the grid of said charging tube, thereby to increase the charging rate of said capacitor.

3. A precision timing system for developing a unidirectional potential linearly proportional to the average time interval between first and second periodically-recurring time-spaced pulses, comprising a sawtooth wave generator having a timing capacitor and a grid-controlled discharge device and a unidirectional voltage source connected in series, means comprising a normally-conductive trigger tube connected in a discharge circuit across said capacitor for normally maintaining a predetermined minimum voltage thereacross, means for abruptly disabling said trigger tube upon the occurrence of each said first pulse and for maintaining it disabled at least throughout said interval, means controlled by the occurrence of each said second pulse for measuring the instantaneous voltage to which said capacitor has charged, means for integrating said voltage measurements to produce a positive unidirectional potential proportional to their average value, and means for impressing said potential on the grid of said device, thereby substantially to reduce the effects of non-linearity in the capacitor charging characteristic upon the linearity of said potential with respect to time.

4. In a precision pulse radar range tracking system, a timing capacitor, means for charging said capacitor comprising a source of unidirectional voltage and a constant-current grid-controlled charging tube connected in series with said capacitor, a normally-conductive trigger tube connected in a discharge circuit across said capacitor, means for applying a negative cutoff pulse to said trigger tube in synchronism with each transmitted radar pulse and of sufficient duration to maintain it cut off throughout a maximum desired range interval, a range tracking circuit controlled by a selected echo pulse for measuring the instantaneous voltage to which said capacitor has charged upon receipt of said echo pulse and for developing a unidirectional average range voltage, and means for impressing said range voltage on the grid of said charging tube to increase the capacitor charging current as a function of the echo range, thereby substantially to reduce range voltage errors due to non-linearity in the capacitor charging rate.

References Cited in the file of this patent

UNITED STATES PATENTS

| | | |
|---|---|---|
| 2,241,256 | Gould | May 6, 1941 |
| 2,265,290 | Knick | Dec. 9, 1941 |
| 2,350,069 | Schrader et al. | May 30, 1944 |
| 2,414,486 | Rieke | Jan. 21, 1947 |
| 2,431,766 | Miller et al. | Dec. 2, 1947 |
| 2,448,069 | Ames, Jr., et al. | Aug. 31, 1948 |